(12) United States Patent
MacDonald et al.

(10) Patent No.: US 7,583,789 B1
(45) Date of Patent: Sep. 1, 2009

(54) X-RAY IMAGING SYSTEMS EMPLOYING POINT-FOCUSING, CURVED MONOCHROMATING OPTICS

(75) Inventors: Carolyn A. MacDonald, Duanesburg, NY (US); Noor Mail, East York (CA); Zewu Chen, Schenectady, NY (US)

(73) Assignees: The Research Foundation of State University of New York, Albany, NY (US); X-Ray Optical Systems, Inc., East Greenbush, NY (US)

( * ) Notice: Subject to any disclaimer, the term of this patent is extended or adjusted under 35 U.S.C. 154(b) by 0 days.

(21) Appl. No.: 11/496,561

(22) Filed: Jul. 31, 2006

Related U.S. Application Data

(60) Provisional application No. 60/704,411, filed on Aug. 1, 2005.

(51) Int. Cl.
 *G21K 1/06* (2006.01)
(52) U.S. Cl. .......................................... 378/84; 378/70
(58) Field of Classification Search .............. 378/70–90
 See application file for complete search history.

(56) References Cited

U.S. PATENT DOCUMENTS

| | | | | |
|---|---|---|---|---|
| 4,203,034 | A | 5/1980 | Carroll, Jr. ................... | 250/280 |
| 4,599,741 | A | 7/1986 | Wittry ......................... | 378/85 |
| 5,127,028 | A | 6/1992 | Wittry ......................... | 378/84 |
| 5,222,113 | A | 6/1993 | Thieme et al. ................. | 379/43 |
| 5,787,146 | A | 7/1998 | Giebeler ...................... | 378/82 |
| 6,259,763 | B1 * | 7/2001 | Bitter et al. ................... | 378/82 |

(Continued)

FOREIGN PATENT DOCUMENTS

DE 19955848 5/2000

(Continued)

OTHER PUBLICATIONS

Li et al., "A Comparison of Doubly Curved Crystals and Polycapillary Optics for Monochromatic Beam Production from a Clinical Source," Physics of Medical Imaging, SPIE vol. 5745, pp. 754-763 (Feb. 2005).

(Continued)

*Primary Examiner*—Hoon Song
(74) *Attorney, Agent, or Firm*—Kevin P. Radigan, Esq.; Heslin Rothenberg Farley & Mesiti P.C.

(57) ABSTRACT

An x-ray imaging system includes an optical device having at least one point-focusing, curved monochromating optic for directing x-rays from an x-ray source towards a focal point. The at least one point-focusing, curved monochromating optic provides a focused monochromatic x-ray beam directed towards the focal point, and a detector is aligned with the focused monochromatic x-ray beam. The optical device facilitates x-ray imaging of an object when the object is located between the optical device and the detector within the focused monochromatic x-ray beam. In various embodiments: each point-focusing, curved monochromatic optic has an optical surface that is doubly-curved; the optical device facilitates passive image demagnification or magnification depending upon placement of the object and detector relative to the focal point; and at least one second point-focusing, curved monochromatic optic can be employed to facilitate refractive index or polarized beam imaging of the object.

38 Claims, 15 Drawing Sheets

U.S. PATENT DOCUMENTS

| | | | |
|---|---|---|---|
| 6,285,506 B1 | 9/2001 | Chen | 359/642 |
| 6,317,483 B1 | 11/2001 | Chen | 378/84 |
| 6,459,763 B1* | 10/2002 | Koinuma et al. | 378/71 |
| 6,697,454 B1* | 2/2004 | Nicolich et al. | 378/85 |
| 6,934,359 B2* | 8/2005 | Chen et al. | 378/84 |
| 2001/0031034 A1* | 10/2001 | Wittry | 378/84 |
| 2001/0043668 A1* | 11/2001 | Hayashi et al. | 378/89 |
| 2004/0096034 A1* | 5/2004 | Michaelsen et al. | 378/70 |

FOREIGN PATENT DOCUMENTS

| | | |
|---|---|---|
| EP | 0 459 833 A2 | 12/1991 |
| EP | 1 482 520 A1 | 12/2004 |
| WO | WO 2004/013867 A2 | 2/2004 |

OTHER PUBLICATIONS

N. Mail et al., "Potential Application of Doubly-Curved Crystal Optics," SPIE vol. 5537, pp. 94-104 (Aug. 2, 2004).

Alianelli et al, "Optical Configurations for X-Ray Imaging by Projection", Journal of Phys., EDP Sciences (France), vol. 104, pp. 267-270 (Mar. 2003).

Hignette et al., "Efficient Sub 100 nm Focusing of Hard X-Rays", Review of Scientific Instruments, AIP USA, vol. 76, No. 6 (Jun. 2005).

Shinohara et al., "Development of an X-Ray Projection Microscope Using Synchrotron Radiation", AIP Conference Proceedings, AIP USA, No. 507, pp. 346-349 (2000).

* cited by examiner

X-RAY IMAGING SYSTEMS EMPLOYING POINT-FOCUSING, CURVED MONOCHROMATING OPTICS

CROSS-REFERENCE TO RELATED APPLICATIONS

This application claims the benefit of U.S. Provisional Application No. 60/704,411, filed Aug. 1, 2005, which is hereby incorporated herein by reference in its entirety.

STATEMENT REGARDING FEDERALLY SPONSORED RESEARCH OR DEVELOPMENT

This invention was made with support from the United States Department of Defense Breast Cancer Research Program under Grant Nos. DAMD 17-02-1-0517 and DAMD 17-02-1-0518. Accordingly, the United States government may have certain rights in the invention.

This application also contains subject matter which is related to the subject matter of the following applications, each of which is hereby incorporated herein by reference in its entirety:

"An Optical Device For Directing X-Rays Having a Plurality of Optical Crystals," by Zewu Chen, U.S. Ser. No. 11/048,146, filed Feb. 1, 2005, which application is a continuation of PCT Application PCT/US2003/023412, filed Jul. 25, 2003, and published under the PCT Articles in English as WO 2004/013867 A2 on Feb. 12, 2004, which PCT application claimed priority to U.S. Provisional Application No. 60/400,809, filed Aug. 2, 2002.

TECHNICAL FIELD

This invention relates generally to devices and methods for focusing high-energy electromagnetic radiation. Specifically, the present invention provides improved imaging systems for directing and three-dimensional focusing x-rays to allow for low dose, high definition imaging of an object, such as a biological object.

BACKGROUND OF THE INVENTION

X-ray analysis techniques have been some of the most significant developments in science and technology over the previous century. The use of x-ray diffraction, x-ray spectroscopy, x-ray imaging, and other x-ray analysis techniques has lead to a profound increase in knowledge in virtually all scientific fields.

Today, x-ray imaging is used in a variety of applications, including medical, scientific and industrial applications. Various ones of these applications can be extremely challenging. For example, screening mammography using x-ray imaging is a critical and challenging application, where dose, contrast, resolution and costs are all important Patient dose is reduced and image quality is increased using monochromatic beams by the removal of low energy photons that are otherwise heavily absorbed in the patient without contributing to the image, and the removal of high energy photons that give relatively low subject contrast and cause Compton scattering, which degrades image quality. One problem, however, is that synchrotrons are expensive, and not generally clinically available. Monochromatic beams can also be achieved by using single crystal diffraction from a conventional source, but such implementations do not give the desired intensity since only the small fraction of the incident beam at the right energy and the right angle is diffracted.

Thus, there exists a need in the art for x-ray imaging system enhancements to, for example, more beneficially balance dose, contrast, resolution and costs considerations than currently available x-ray imaging systems.

SUMMARY OF THE INVENTION

The shortcomings of the prior art are overcome and additional advantages are provided through the provision of an x-ray imaging system which includes an x-ray source, an optical device, and a detector. The optical device, which directs x-rays from the x-ray source, includes at least one point-focusing, curved monochromating optic for directing x-rays from the x-ray source towards a focal point. The at least one point-focusing, curved monochromating optic directs a focused monochromatic x-ray beam towards the focal point, and the detector is aligned with the focused monochromatic x-ray beam directed from the optical device. The optical device facilitates x-ray imaging of an object using the detector when the object is placed between the optical device and the detector, within the focused monochromatic x-ray beam directed from the optical device.

In enhanced implementations, each point-focusing, curved monochromatic optic has a doubly-curved optical surface, and the at least one point-focusing, curved monochromating optic comprises a plurality of doubly-curved optical crystals or a plurality of doubly-curved multilayer optics.

The optical device facilitates passive image demagnification of an object when the object is placed before the focal point, and the detector is located closer to the focal point than the object is to the focal point. The optical device facilitates passive image magnification of an object when the detector is located further from the focal point than the object is to the focal point. Depending upon the imaging application, the object can be placed either before or after the focal point, as can the detector.

In a further aspect, an imaging system is provided which includes an x-ray source, a first optical device, a second optical device, and a detector. The first optical device includes at least one first point-focusing, curved monochromating optic for directing x-rays from the x-ray source towards a first focal point in the form of a first focused monochromatic x-ray beam. The second optical device is aligned with the first focused monochromatic x-ray beam, and includes at least one second point-focusing, curved monochromating optic for directing x-rays of the first focused monochromatic x-ray beam towards a second focal point in the form of a second focused monochromatic x-ray beam. The detector is aligned with the second focused monochromatic x-ray beam. The first and second optical devices facilitate imaging of an object using the detector when the object is placed between the first optical device and the second optical device, within the first focused monochromatic x-ray beam.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
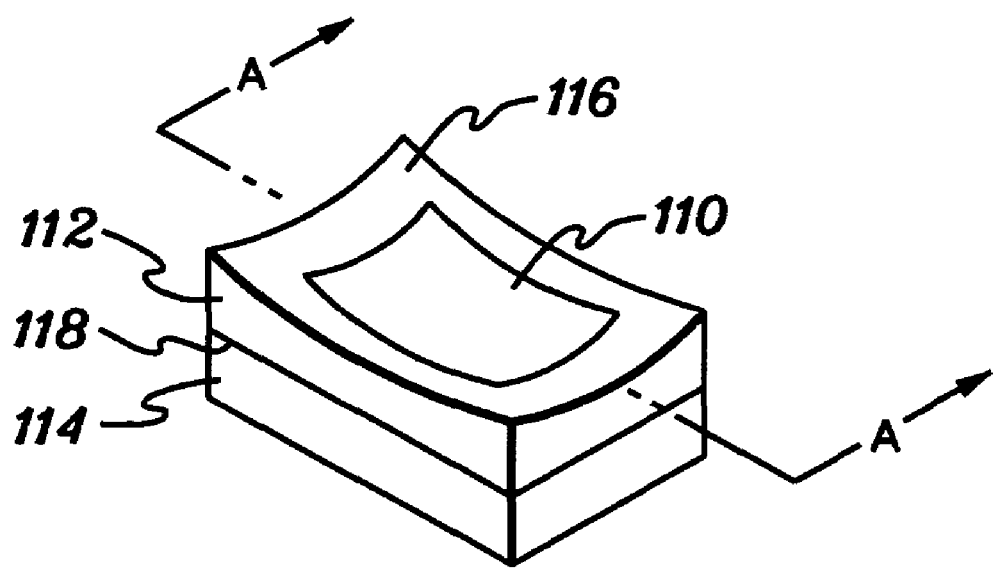
FIG. 1 depicts one embodiment of a point-focusing, curved monochromating optic for an x-ray imaging system, in accordance with an aspect of the present invention.

In the following discussion and the appended claims, various aspects of the present invention are described in terms of their application to the modification of the path of x-ray radiation, but it should be understood that the present invention is applicable to the manipulation and use of other types of radiation, for example, gamma rays, electron beams and neutrons.

In areas of x-ray spectroscopy, high x-ray beam intensity is an essential requirement to reduce sample exposure times and, consequently, to improve the signal-to-noise ratio of x-ray analysis measurements. In the past, expensive and powerful x-ray sources, such as high-power sealed tubes, rotating anode x-ray tubes or synchrotrons, were the only options available to produce high-intensity x-ray beams. Recently, the development of x-ray optical devices has made it possible to collect the diverging radiation from an x-ray source by focusing the x-rays. A combination of x-ray focusing optics and small, low-power x-ray sources can produce x-ray beams with intensities comparable to those achieved with more expensive devices. As a result, systems based on a combination of small x-ray sources and collection optics have greatly expanded the capabilities of x-ray analysis equipment in, for example, small laboratories, or in-situ field, clinic, process line or factory applications.

One existing x-ray optical technology is based on diffraction of x-rays by crystals, for example, germanium (Ge) or silicon (Si) crystals. Curved crystals can provide deflection of diverging radiation from an x-ray source onto a target, as well as providing monochromatization of photons reaching the target. Two different types of curved crystals exist: singly-curved crystals and doubly-curved crystals (DCC). Using what is known in the art as Rowland circle geometry, singly-curved crystals provide focusing in two dimensions, leaving x-ray radiation unfocused in the third or orthogonal plane. Doubly-curved crystals provide focusing of x-rays from the source to a point target in all three dimensions, for example, as disclosed by Chen and Wittry in the article entitled "Microprobe X-ray Fluorescence with the Use of Point-focusing Diffractors," which appeared in Applied Physics Letters, 71 (13), 1884 (1997), the disclosure of which is incorporated by reference herein. This three-dimensional focusing is referred to in the art as "point-to-point" focusing.

The point-to-point focusing property of certain doubly-curved crystals has many important applications in, for example, material science structural or composition analysis. Curved crystals further divide into Johansson and Johan types. Johansson geometry requires, e.g., crystal planes to have a curvature that is equal to twice the radius of the Rowland circle, but a crystal surface grinded to the radius of the Rowland circle, while Johan geometry configuration requires, e.g., a curvature twice the radius of the Rowland circle.

One advantage of providing a high-intensity x-ray beam is that the desired sample exposure can typically be achieved in a shorter measurement time. The potential to provide shorter measurement times can be critical in many applications. For example, in some applications, reduced measurement time increases the signal-to-noise ratio of the measurement. In addition, minimizing analysis time increases the sample throughput in, for example, industrial applications, thus improving productivity. Another important application is x-ray imaging, which is the application to which the present invention is directed.

Presented herein are various radiation imaging systems for facilitating three-dimensional focusing of characteristic x-rays by diffraction employing optical devices, such as point focusing, monochromating curved optics. Implementation of high contrast monochromatic imaging utilizing very low power sources is demonstrated using point focusing, monochromating curved optics at, for example, patient imaging energies. The curved optic can comprise various optical devices, including one or more doubly-curved crystal (DCC) optics or one or more doubly-curved multilayer optics. One embodiment of such a doubly-curved optical device is depicted in FIGS. 1 and 1A, and is described in detail in U.S.

Pat. No. 6,285,506 B1, issued Sep. 4, 2001, the entirety of which is hereby incorporated herein by reference.

Figure 1A:
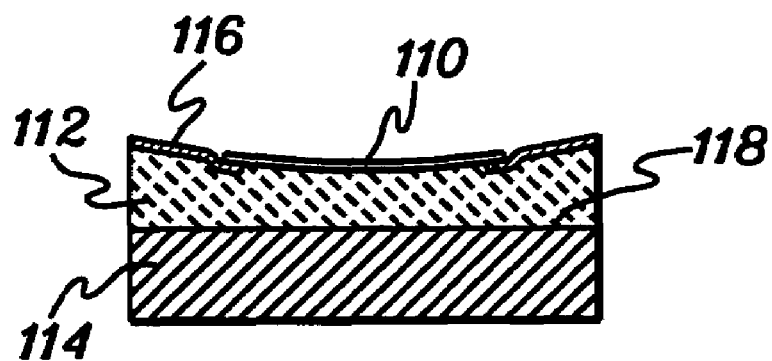
FIG. 1A is a cross-sectional elevational view of the structure of FIG. 1, taken along line A-A.

In the embodiment of FIG. 1, a doubly-curved optical device includes a flexible layer 110, a thick epoxy layer 112 and a backing plate 114. The structure of the device is shown further in the cross-sectional elevational view in FIG. 1A.

In this device, the epoxy layer 112 holds and constrains the flexible layer 110 to a selected geometry having a curvature. Preferably, the thickness of the epoxy layer is greater than 20 µm and the thickness of the flexible layer is greater than 5 µm. Further, the thickness of the epoxy layer is typically thicker than the thickness of the flexible layer. The flexible layer can be one of a large variety of materials, including: mica, Si, Ge, quartz, plastic, glass etc. The epoxy layer 112 can be a paste type with viscosity in the order of $10^3$ to $10^4$ poise and 30 to 60 minutes pot life. The backing plate 114 can be a solid object that bonds well with the epoxy. The surface 118 of the backing plate can be flat (FIG. 1A) or curved, and its exact shape and surface finish are not critical to the shape and surface finish of the flexible layer. In the device of FIGS. 1 & 1A, a specially prepared backing plate is not required.

Surrounding the flexible layer may be a thin sheet of protection material 116, such as a thin plastic, which is used around the flexible layer edge (see FIG. 1A). The protection material protects the fabrication mold so that the mold is reusable, and would not be necessary for a mold that is the exact size or smaller than the flexible layer, or for a sacrificial mold.

Figure 2:
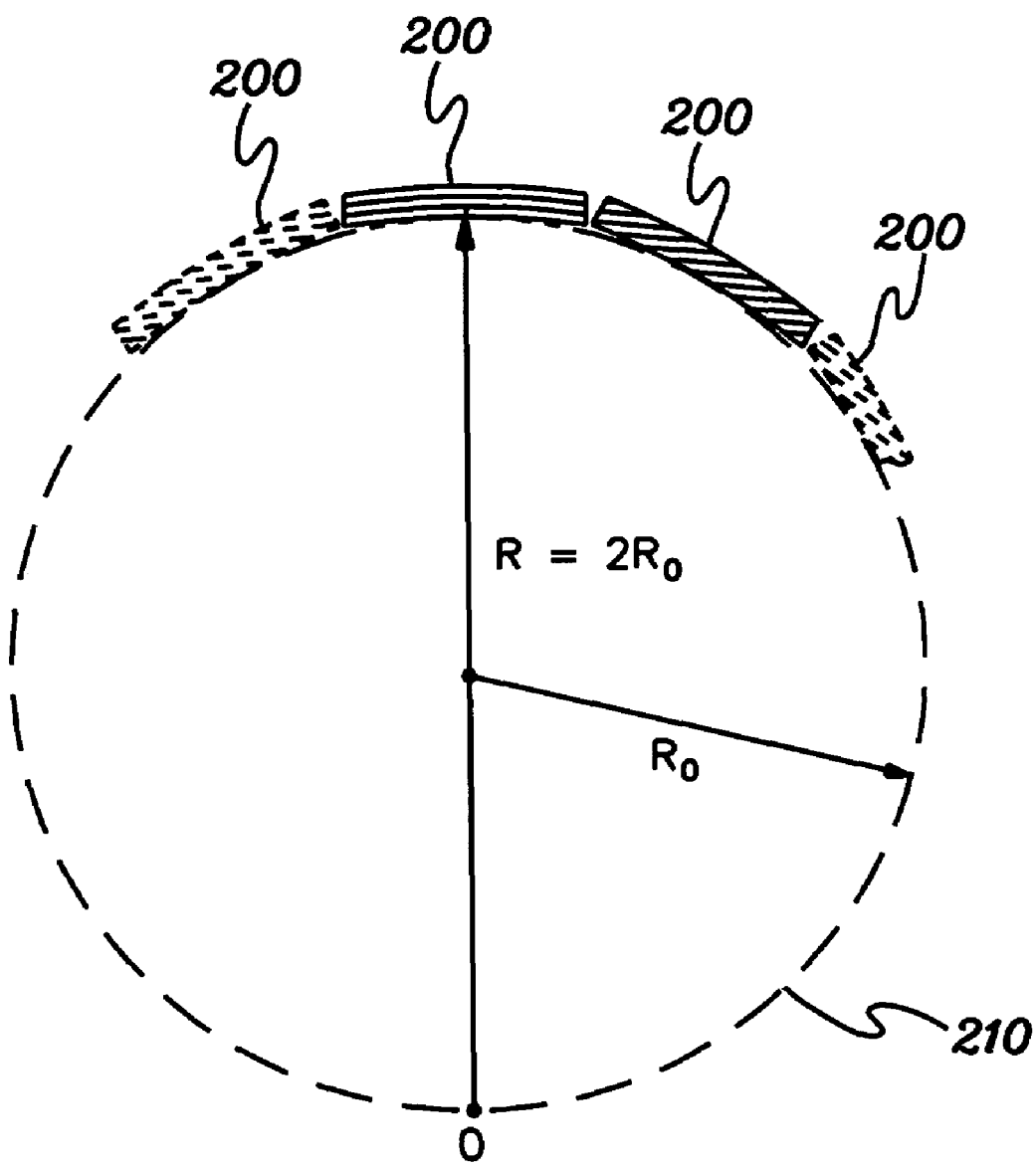
FIG. 2 depicts one embodiment of an optical device (and illustrating Rowland circle geometry) for use in one embodiment of an x-ray imaging system, in accordance with an aspect of the present invention.

Doubly-curved optical devices, such as doubly-curved crystal (DCC) optics, are now used in material analysis to collect and focus x-rays from a large solid angle and increase the usable flux from an x-ray source. As noted, three-dimensional focusing of characteristic x-rays can be achieved by diffraction from a toroidal crystal used with a small electronic bombardment x-ray source. This point-to-point Johan geometry is illustrated in FIG. 2. The diffracting planes of each crystal optic element 200 can be parallel to the crystal surface. If the focal circle 210 containing a point source and the focal point has radius $R_0$, then the crystal surface has a radius R of curvature of $2R_0$ in the plane of the focal circle and a radius of curvature of $r=2R_0 \sin^2 \theta_{Brag}$ in the perpendicular plane, with the radius centered on a line segment drawn between the source and the focal point. X-rays diverging from the source, and incident on the crystal surface at angles within the rocking curve of the crystal will be reflected efficiently to the focal or image point. The monochromatic flux density at the focal point for a DCC-based system is several orders of magnitude greater than that of conventional systems with higher power sources and similar source to object distances. This increase yields a very high sensitivity for use in many different applications, including (as described herein) radiographic imaging.

As a further enhancement, FIG. 2 illustrates that the optical device may comprise multiple doubly-curved crystal optic elements 200 arranged in a grid pattern about the Rowland circle. Such a structure may be arranged to optimize the capture and redirection of divergent radiation via Bragg diffraction. In one aspect, a plurality of optic crystals having varying atomic diffraction plane orientations can be used to capture and focus divergent x-rays towards a focal point. In another aspect, a two or three dimensional matrix of crystals can be positioned relative to an x-ray source to capture and focus divergent x-rays in three dimensions. Further details of such a structure are presented in the above-incorporated, co-pending U.S. patent application Ser. No. 11/048,146, entitled "An Optical Device for Directing X-Rays Having a Plurality of Optical Crystals".

Point focusing, monochromating curved optics, such as the doubly-curved crystals (DCC) discussed above, are employed herein to point focus and monochromatically redirect x-rays from a large solid angle x-ray source for x-ray imaging. Monochromatic beams improve contrast and minimize radiation dose, which can be significant where a lower powered source is desired or where the object to be imaged is a patient. Although described in detail herein below with respect to mammography, it should be understood that the x-ray imaging system and techniques described herein are applicable to radiographic imaging in general, and not to any particular application. For example, the systems and techniques described can be employed to image any biological object, or non-biological object, such as an integrated circuit chip.

Figure 3:
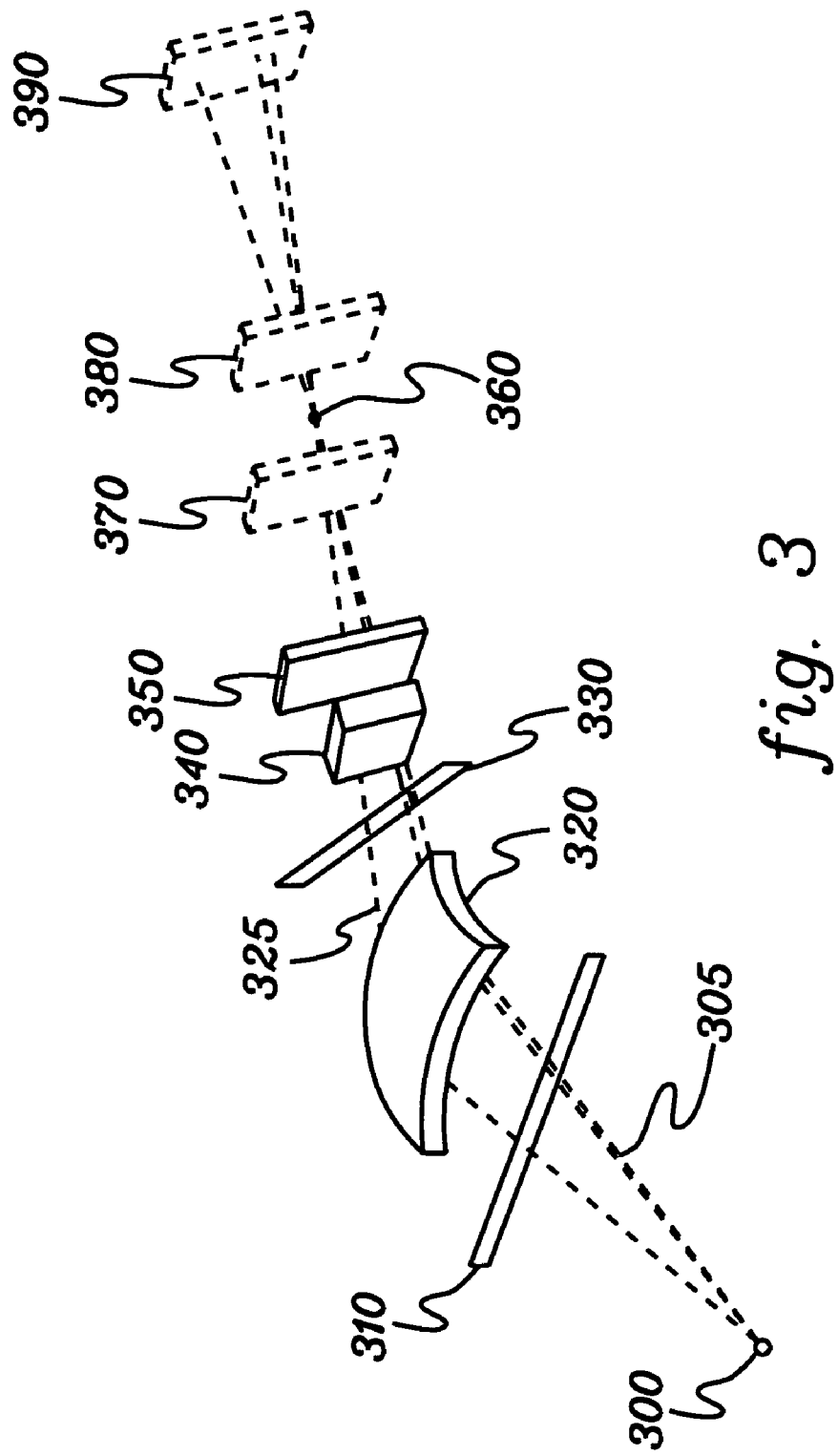
FIG. 3 depicts in schematic form one embodiment of an x-ray imaging system, in accordance with an aspect of the present invention.

Monochromatic beams are achieved herein by employing point-focusing, monochromating curved optics. One embodiment of an x-ray imaging system employing such an optic is depicted in FIG. 3. As shown, x-rays 305 from an x-ray source 300 are directed by an optical device 320 comprising at least one point-focusing, curved monochromating optic, to controllably converge at a focal point 360. The size of the x-ray source can vary with the x-ray imaging application. Typically the source would be a conventional x-ray source, such as an electron impact source including a conventional fixed anode or rotating anode x-ray tube. For certain applications however low power sources may be used, for example less than 500 Watts.

The curved monochromating optic 320 directs x-rays from the source towards the focal point as a focused monochromatic x-ray beam 325. An input focal slit 310 and output focal slit 330 may be employed alone or together to further limit background radiation, limit divergence or shape the output beam. An object 340 to be imaged is placed within the focused monochromatic x-ray beam 325 after optical device 320. Object 340 can be placed either before focal point 360 as shown, or after focal point 360. With object 340 disposed before the focal point, a detector 350 can be located before the focal point or after the focal point. Detector 350 is an imaging detector that provides a two-dimensional map of x-ray intensity. This can be either a direct detector or an indirect detector coupled to a phosphor (which converts x-rays to visible light). The detector could be film, a film/screen cassette, a CCD coupled to a phosphor, an amorphous selenium or amorphous silicon detector, a computed radiography plate, a CdZnTe detector, or any other analog or digital detector.

If detector 350 is located before focal point 360, then the image can be demagnified onto the detector when the detector is placed closer to the focal point, for example, at locations 370 or 380. Alternatively, the object can be magnified onto a larger detector located at location 390, i.e., with the detector disposed further from focal point 360 than object 340. Magnification is beneficial if system resolution is detector limited, while demagnification is beneficial if it is desired to use smaller, cheaper detectors.

Figure 4:
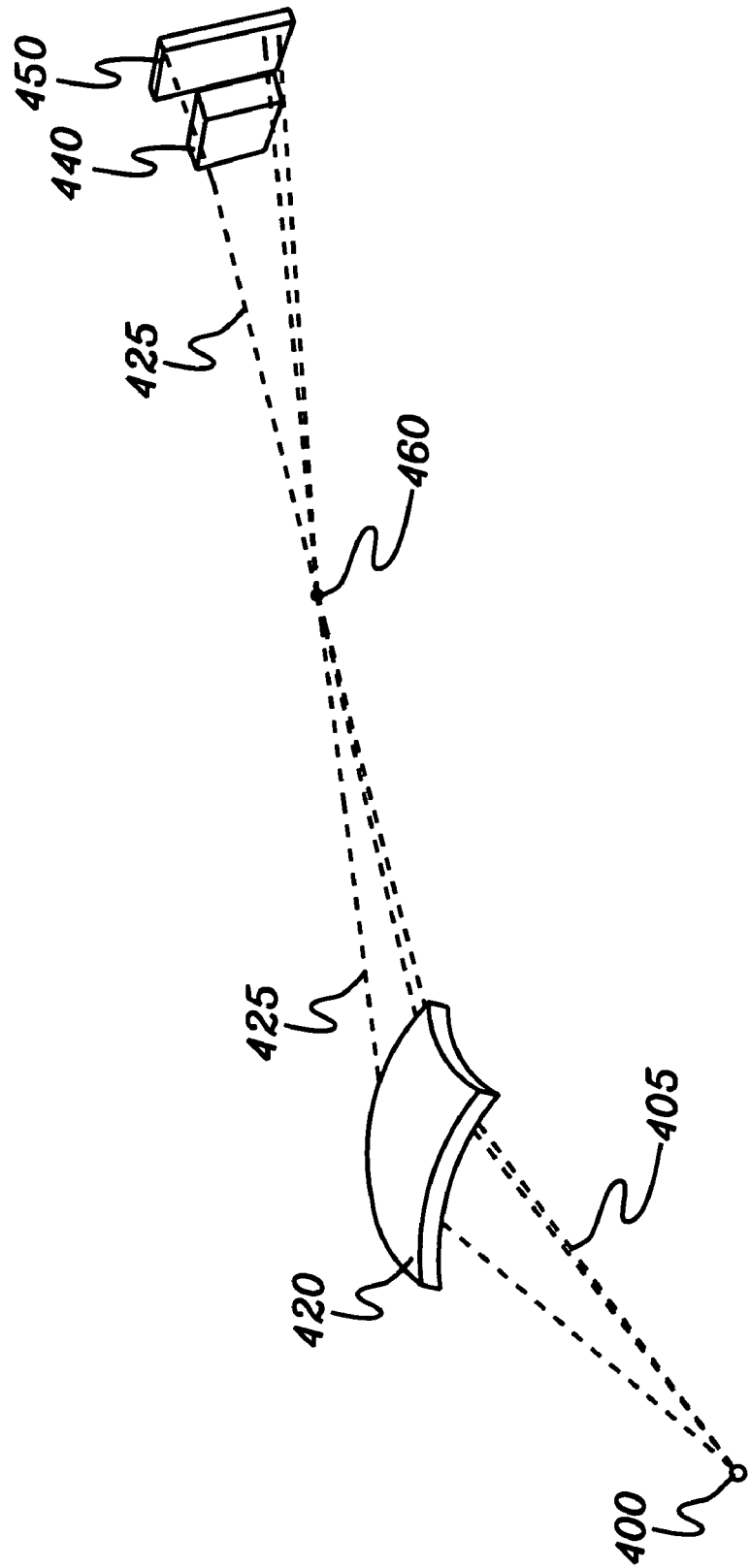
FIG. 4 depicts in schematic form an alternate embodiment of an x-ray imaging system, in accordance with an aspect of the present invention.

Image blur due to angular divergence can be reduced by placing the detector at location 350, near to object 340, and further reduced by increasing the distance between the object and the focal point, as shown in FIG. 4. In FIG. 4, x-rays 405 from an x-ray source 400 are again directed by an optical device 420, comprising a point-focusing, curved monochromating optic, into a focused monochromatic x-ray beam 425 to controllably converge at a focal point 460. In this embodiment, object 440 to be imaged is located after the focal point in order to be further from the focal point than possible if disposed between optical device 420 and focal point 460. Imaging detector 450 is placed near object 440.

Intensity of the point-focused, monochromatic beam is tailored to a particular imaging application. Intensity depends, in part, on the collected solid angle, which can be increased by decreasing the input focal distance between the x-ray source and the optical device, or by increasing the size of the optical device or by using multiple point-focusing, curved monochromating optics arranged in a structure such as depicted in the above-incorporated U.S. patent application Ser. No. 11/048,146, entitled "An Optical Device for Directing X-Rays Having a Plurality of Optical Crystals". The resolution of the image can be improved by decreasing the angular divergence of the point-focused monochromatic beam, which can be accomplished by increasing the object-to-focal-point distance, or increasing the output focal distance. Intensity and resolution can also be adjusted by employing an optical device with a symmetrical optic having equal input and output focal lengths, or an asymmetrical optic with differing input and output focal lengths.

Figure 5:
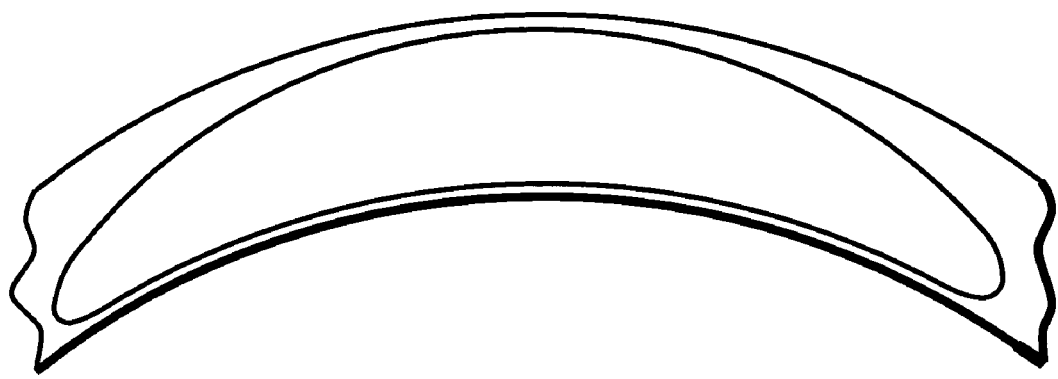
FIG. 5 depicts an x-ray beam exposure from a doubly-curved optical segment of an optical device employed by an x-ray imaging system, in accordance with an aspect of the present invention.
Figure 5A:
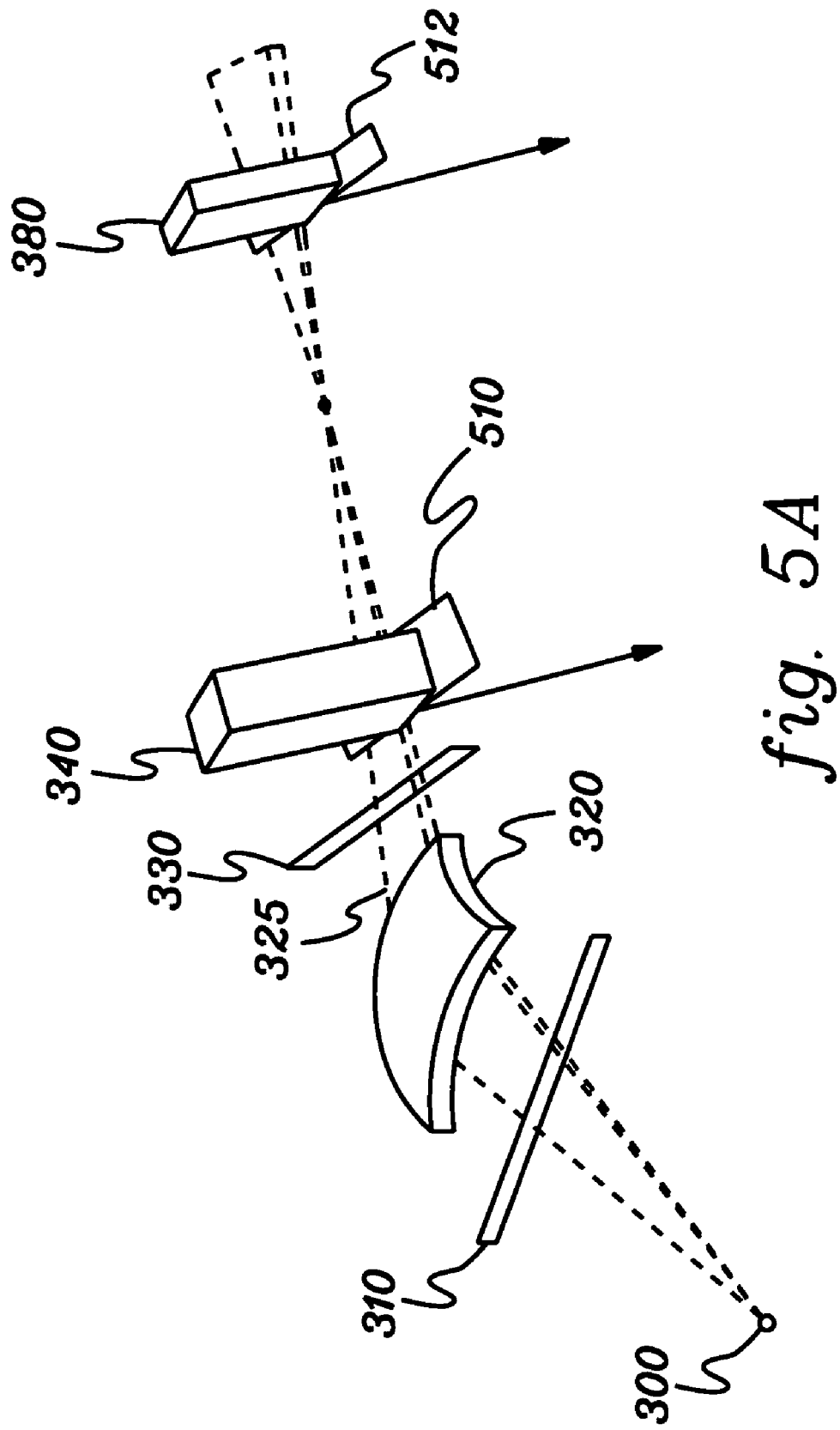
FIGS. 5A-C depict several, non-exclusive embodiments of mechanically scanning various components of the systems disclosed herein to facilitate large area coverage without requiring larger component distances, in accordance with certain aspects of the present invention.
Figure 5B:
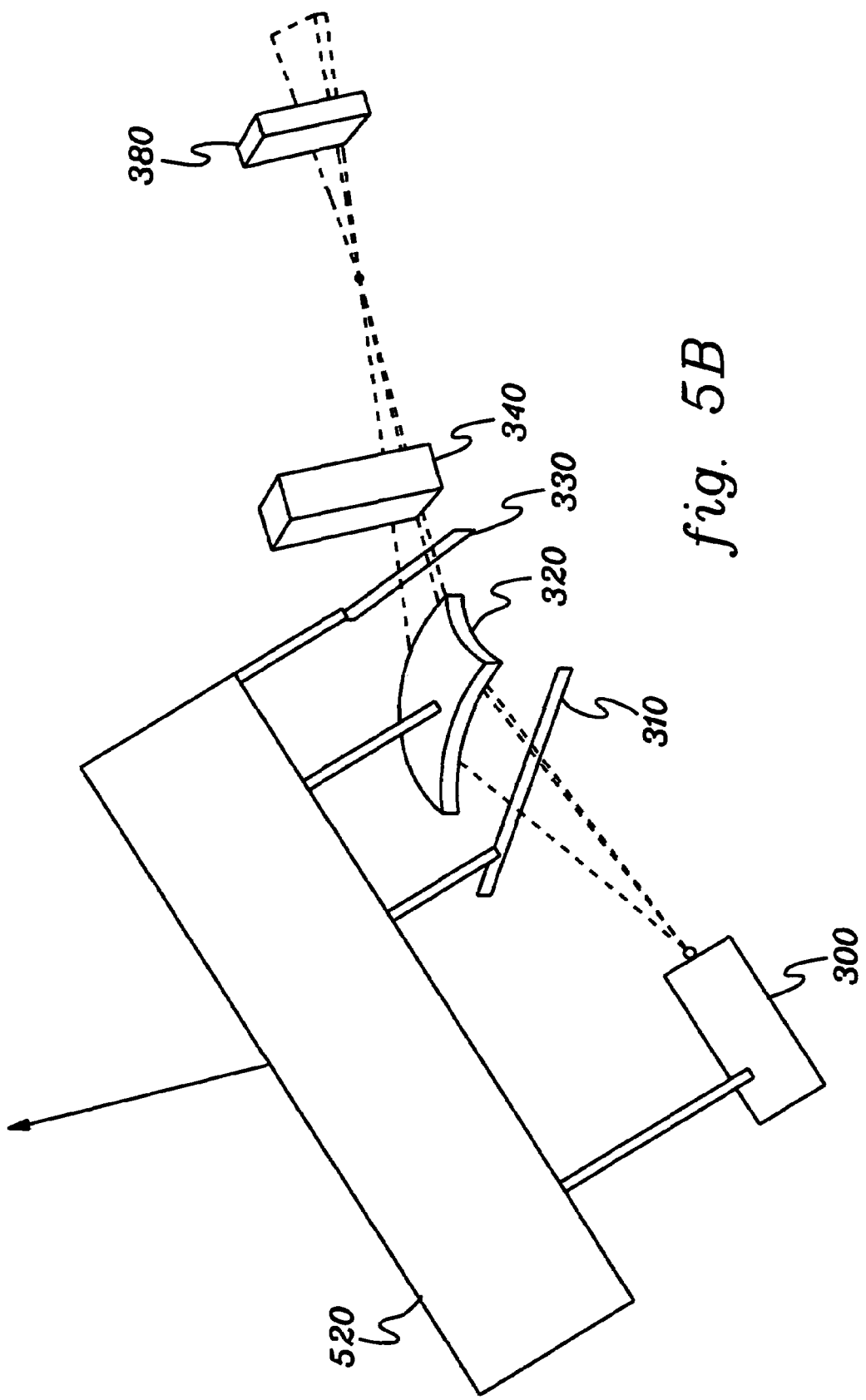
Figure 5C:
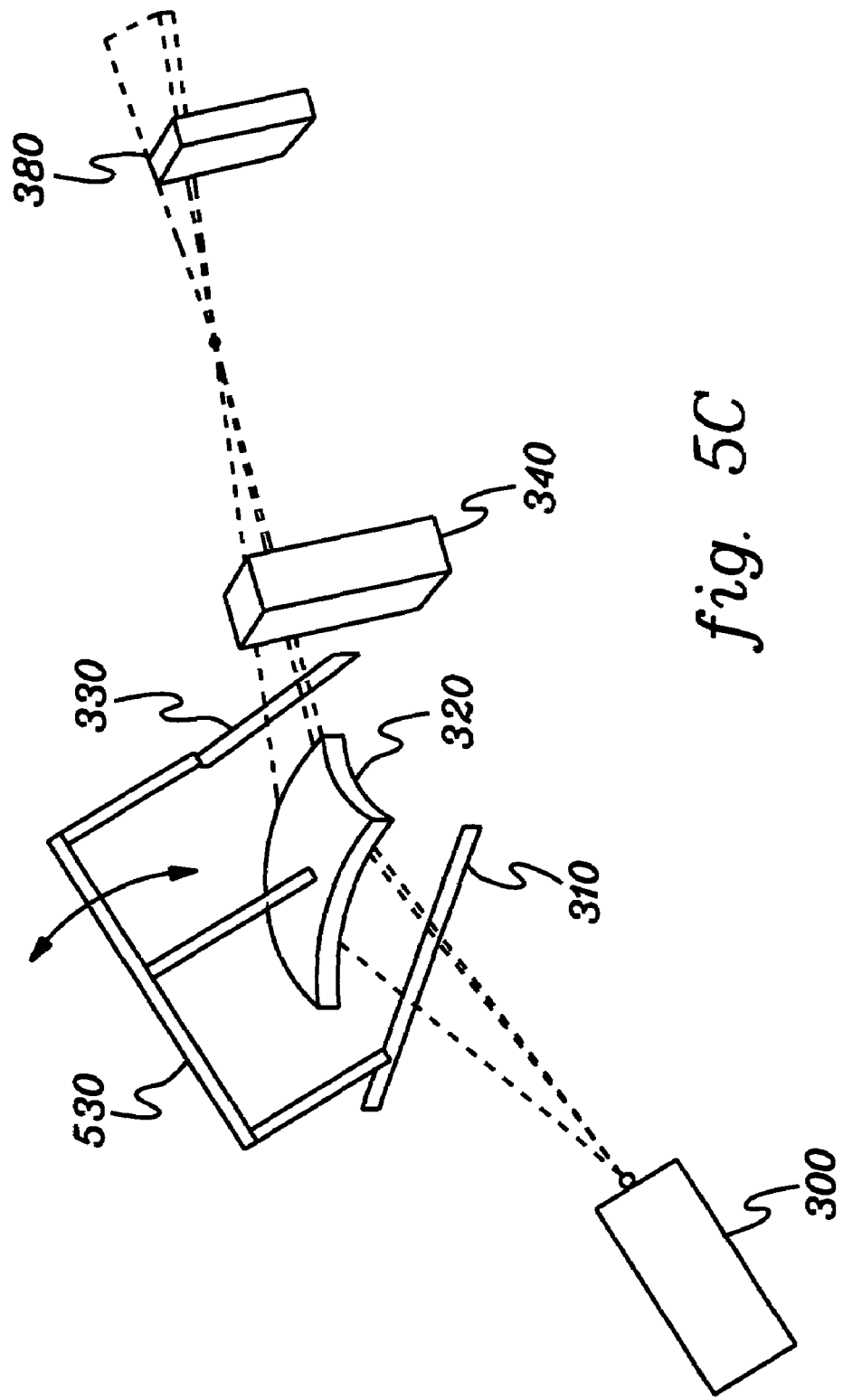

A doubly-curved optical device such as described herein produces a curved fan beam output, such as shown by way of example, in FIG. 5. This fan beam output can be scanned across the object in a manner similar to a conventional slot/scan system. Scanning, which facilitates covering a large area without requiring a very large object-to-optic distance, could be accomplished by (1) moving the object across the beam or (2) by moving the source and optic(s) together so that the beam crosses the object, or (3) by rotating the optic so that the input remains pointed at the source but the output scans across the object. These options are shown respectively with reference to FIGS. 5A-C. In these figures (where like numerals are used to denote like elements), the system of FIG. 3 is used as an example, but those skilled in the art will recognize that these principles can be extended to any of the imaging systems disclosed herein. FIG. 5A depicts gantries 510 and 512 to move the object 340 and large area detector 380 across the beam. The object is moved, for example, in the direction perpendicular to the beam across its narrow dimension. The detector is moved, for example, simultaneously in the same direction, at a speed equal to the magnification factor times the object speed. FIG. 5B depicts a gantry 520 supporting source 300, optic 320, and slits 310 and 330 (if any), collectively scanned to move the beam across the stationary object 340. FIG. 5C depicts a gantry 530 supporting optic 320 and slits 310 and 330 (if any), scanned to move the optic 320 along a circle centered at the source, maintaining the alignment at the Bragg angle. Depending on the constraints of the source geometry, it may be necessary to simultaneously rotate the source housing. Those skilled in the art will recognize that features of these scanning systems may be combined to produce the desired results. The detector could be a large area detector fixed with respect to the object, or a smaller detector, for example the size of the output beam, which is fixed with respect to the beam and records the changes as the object moves with respect to the beam. The beam can be limited to a straight fan with the use of slits, such as depicted in FIG. 3, or employed as single or multiple curved segments. Further, significant reduction in scatter production when imaging large objects is obtained using a scanned beam.

Figure 6:
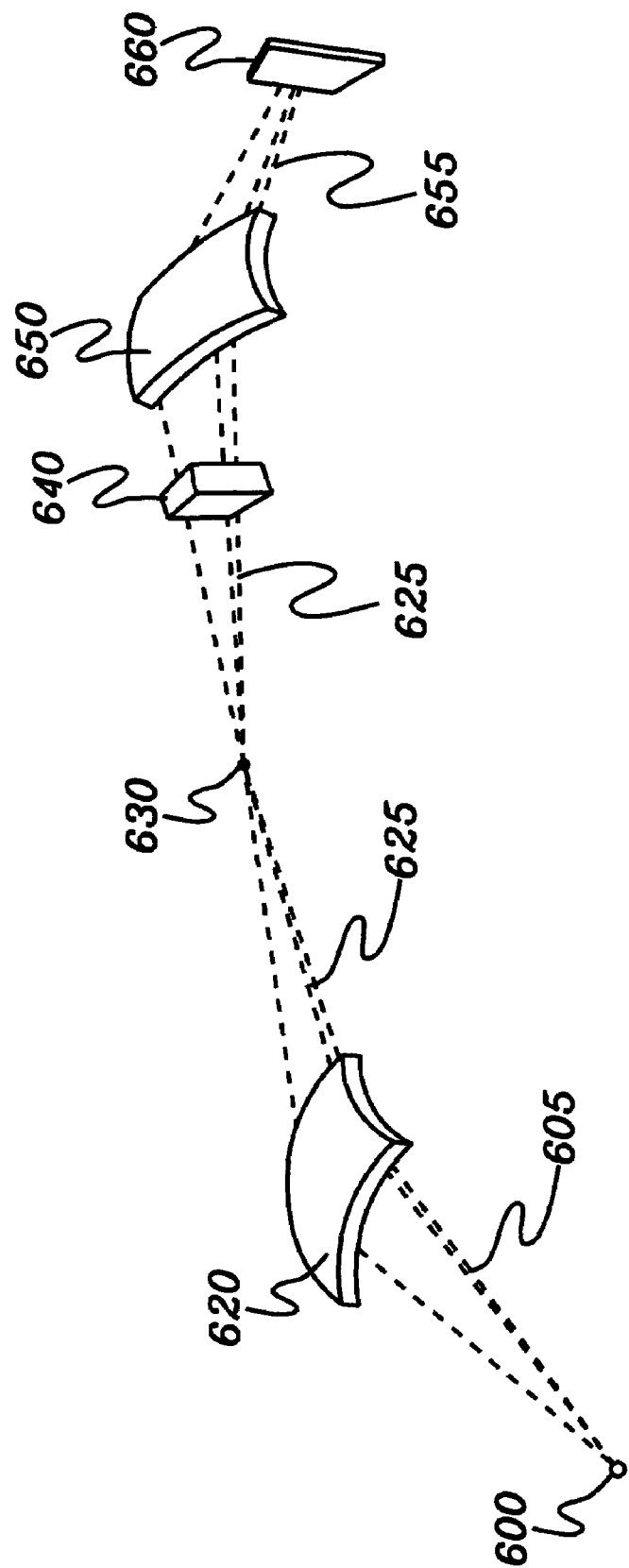
FIG. 6 depicts in schematic form a further embodiment of an x-ray imaging system, in accordance with an aspect of the present invention.

The output focal spot from a doubly-curved optical device can be used as the source for a second optical device (as shown in FIG. 6) to effect refractive contrast (diffraction enhanced) imaging. In this embodiment, a doubly-curved optical device 620 collects radiation 605 from an x-ray source 600 and directs the radiation in a point-focused monochromatic x-ray beam 625 to converge at a first focal point 630, which as noted, is the x-ray source for a second optical device 650. Device 650, which comprises a second doubly-curved optical device, directs focused monochromatic x-ray beam 625 into a second point-focused monochromatic x-ray beam 655 to converge at a second focal point (not shown). In this embodiment, an object 640 to be imaged is disposed between the first optical device 620 and the second optical device 650 within the point-focused monochromatic x-ray beam. Imaging detector 660 is aligned with an axis of the second focused monochromatic x-ray beam 655 output from the second optical crystal 650. Gradients in refractive index in the object deflect the x-rays, which produce contrast in the manner termed "refractive index imaging" or "diffraction enhanced imaging" when employed with flat crystals.

As a variation to the embodiment of FIG. 6, the first optical device 620 may be used with a Bragg angle near 45° so that its output beam is polarized, and the second optical device 650 may be placed orthogonal to the first optical device (and also have a Bragg angle near 45°) so that it functions as an analyzing filter. For example, in this embodiment, if the beam from the source travels in the x direction, the diffracted beam from the first optical device travels in the y direction, and the diffracted beam from the second optical device (which will not exist unless there is depolarization in the object) travels in the z direction. This allows polarized beam imaging which can increase the contrast and reduce background.

Thus, doubly-curved optical devices are employed herein to produce a point-focused, monochromatic beam with high intensity and good angular resolution for various imaging applications. The monochromatic x-rays and the narrow output beam reduce the scatter produced in the patient or object, which improves the contrast and lowers the required dose. This is especially advantageous if no anti-scatter grid is employed. Employing pairs of optics as illustrated in FIG. 6 allows for high contrast refractive index imaging using conventional x-ray sources, or even low power x-ray sources (i.e., sources less than 1 kW).

Experimental results for various monochromatic radiography implementations are described below with reference to FIGS. 7-12.

Figure 7:
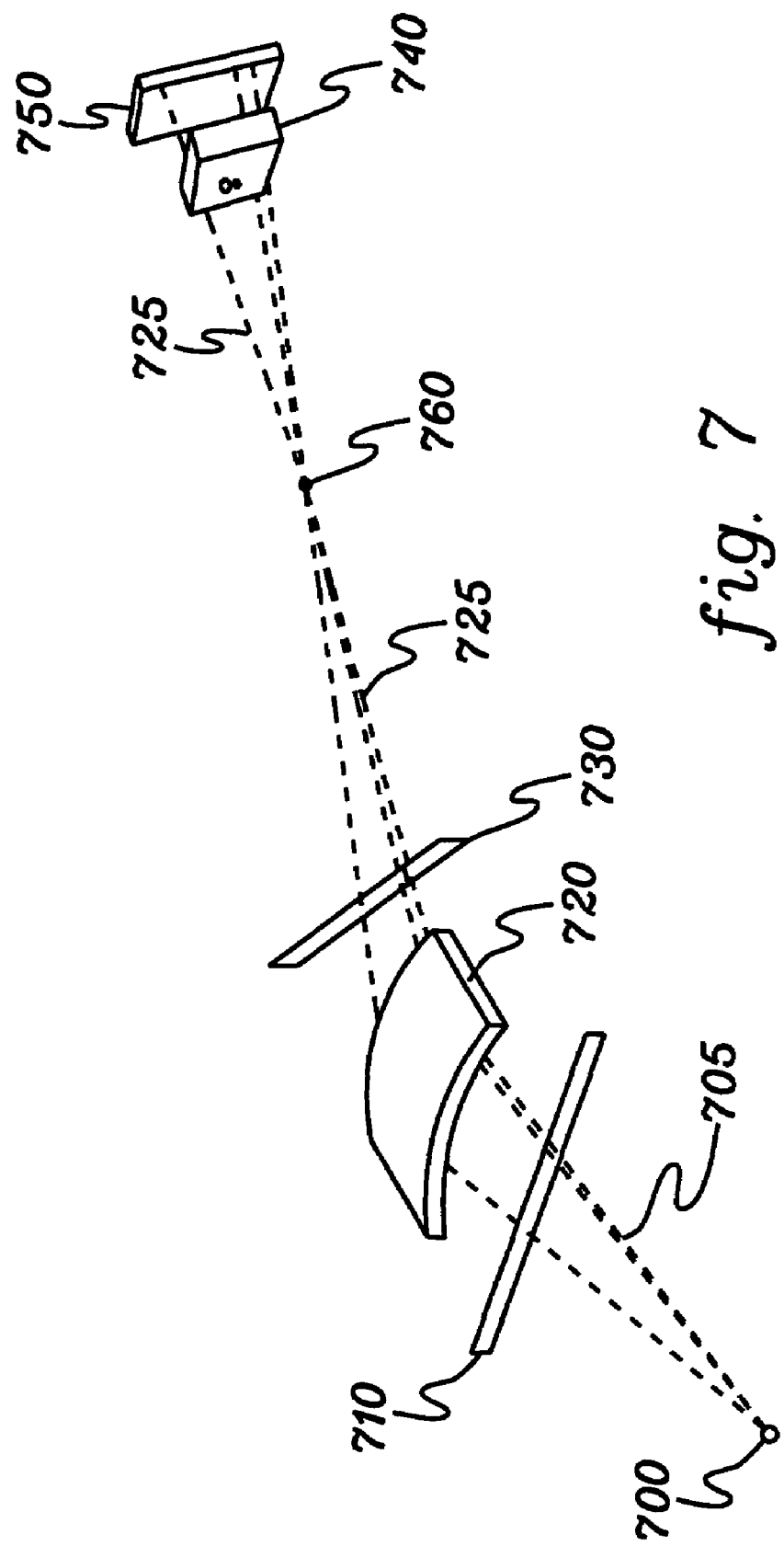
FIG. 7 depicts in schematic form another embodiment of an x-ray imaging system, in accordance with an aspect of the present invention.

FIG. 7 is a further schematic diagram of a monochromatic imaging system, in accordance with an aspect of the present invention. This system again employs an optical device comprising a point-focusing, doubly-curved optic, such as a doubly-curved crystal (DCC) optic. The imaging system includes an x-ray source 700 which provides x-rays 705 via slit 710 to optical device 720. Device 720 directs the x-rays in a focused monochromatic x-ray beam 725 through a second slit 730 towards a focal point 760. An object to be imaged 740 is disposed, in this example, after the focal point 760, with the detector 750 placed close by the object. The parameters of the DCC optic for the experiments performed are shown in Table 1. The source was a Microfocus Mo source, from Oxford Instruments, LTC, with a maximum source power of 120 watts, and the detector was a Fuji Computed Radiography Plate.

TABLE 1

| DCC optics | Energy (keV) | $\theta_{Bragg}$ (°) | Input focal dist. (mm) | Output focal dist. (mm) | Vertical convergence (°) | Horizontal convergence (°) |
|---|---|---|---|---|---|---|
| Si (220) | 17.5 | 10.6 | 120 | 120 | 9 | 0.7 |

Figure 8:
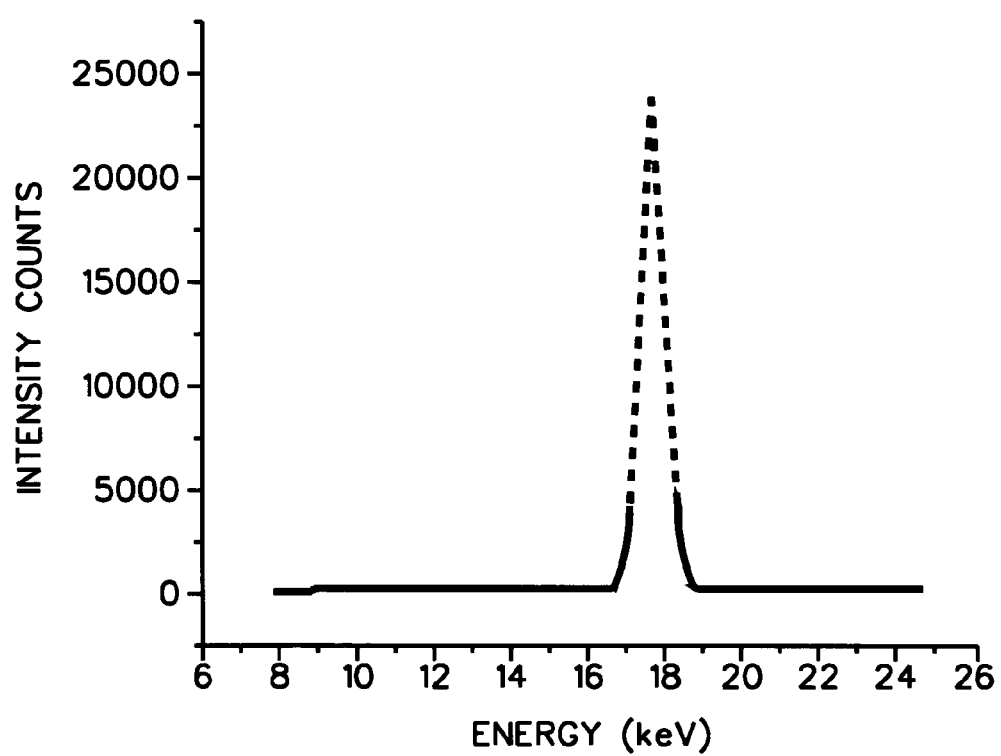
FIG. 8 is a graph showing intensity counts versus energy for an x-ray imaging system employing a point-focusing, curved monochromating optic, and a source voltage of 25 kV, a current of 0.1 mA, and a recording time of 20 seconds, in accordance with an aspect of the present invention.

The DCC optic was mounted on two translation stages transverse to the x-ray beam and roughly placed at the designed focal distance from the source spot. Rough source to optic alignment was first performed with a CCD camera. The camera was placed at the $2\theta_{Bragg}$ angle at 180 mm from the optic to intercept the diffracted image and the optic scanned to obtain the maximum brightness. Then the diffracted intensity was recorded with a Ge detector (which gives total photon flux in the whole beam) and maximized by scanning the DCC optic along the x and y directions at different z positions. The resulting output spectrum is shown in FIG. 8. In FIG. 8, a diffraction spectrum with a DCC optic with source voltage of 25 kV, current of 0.1 mA and a recording time of 20 seconds is shown. Note that the measured spectral width is detector limited.

Figure 9:
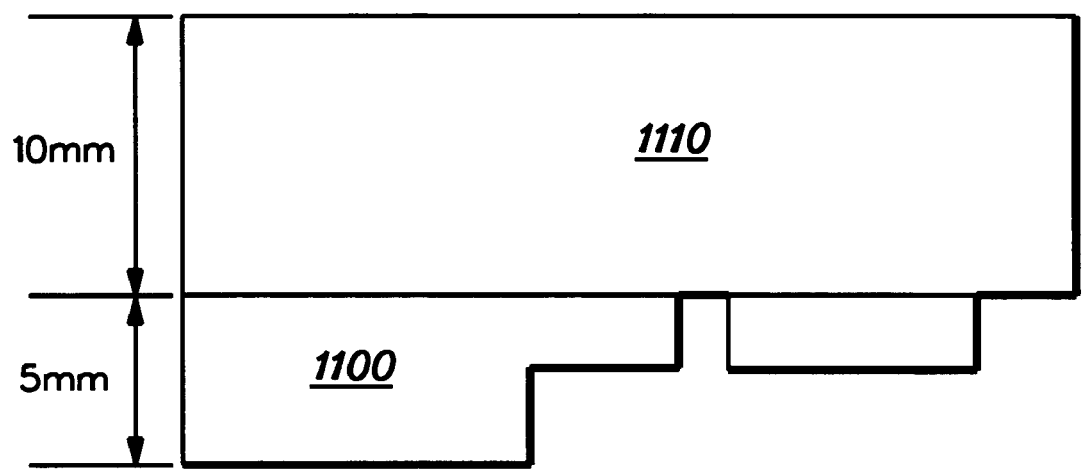
FIG. 9 is a block diagram depiction of a 5 mm step phantom of polypropylene attached to a 10 mm polymethyl methacrylate block for use in testing the x-ray imaging system of FIG. 7, in accordance with an aspect of the present invention.

Contrast measurements were performed with two plastic phantoms as depicted in FIG. 9. As shown in FIG. 9, a 5 mm step phantom 1100 of polypropylene was employed attached to a 10 mm polymethyl methacrylate block 1110. The phantom was placed at a 70 mm distance beyond the output focal point as shown in FIG. 7, with a computed radiography plate immediately adjacent. The beam size at the position was approximately 1 mm along the horizontal axis and 10 mm along the vertical axis. The phantom and the plate were mounted on three translation stages and scanned along the vertical direction. The image size of approximately 200 mm² was obtained in an exposure time in the range 2-5 minutes with a 10 W source. This would correspond to an exposure of less than one second for a 10 kW pulse source.

Figure 10:
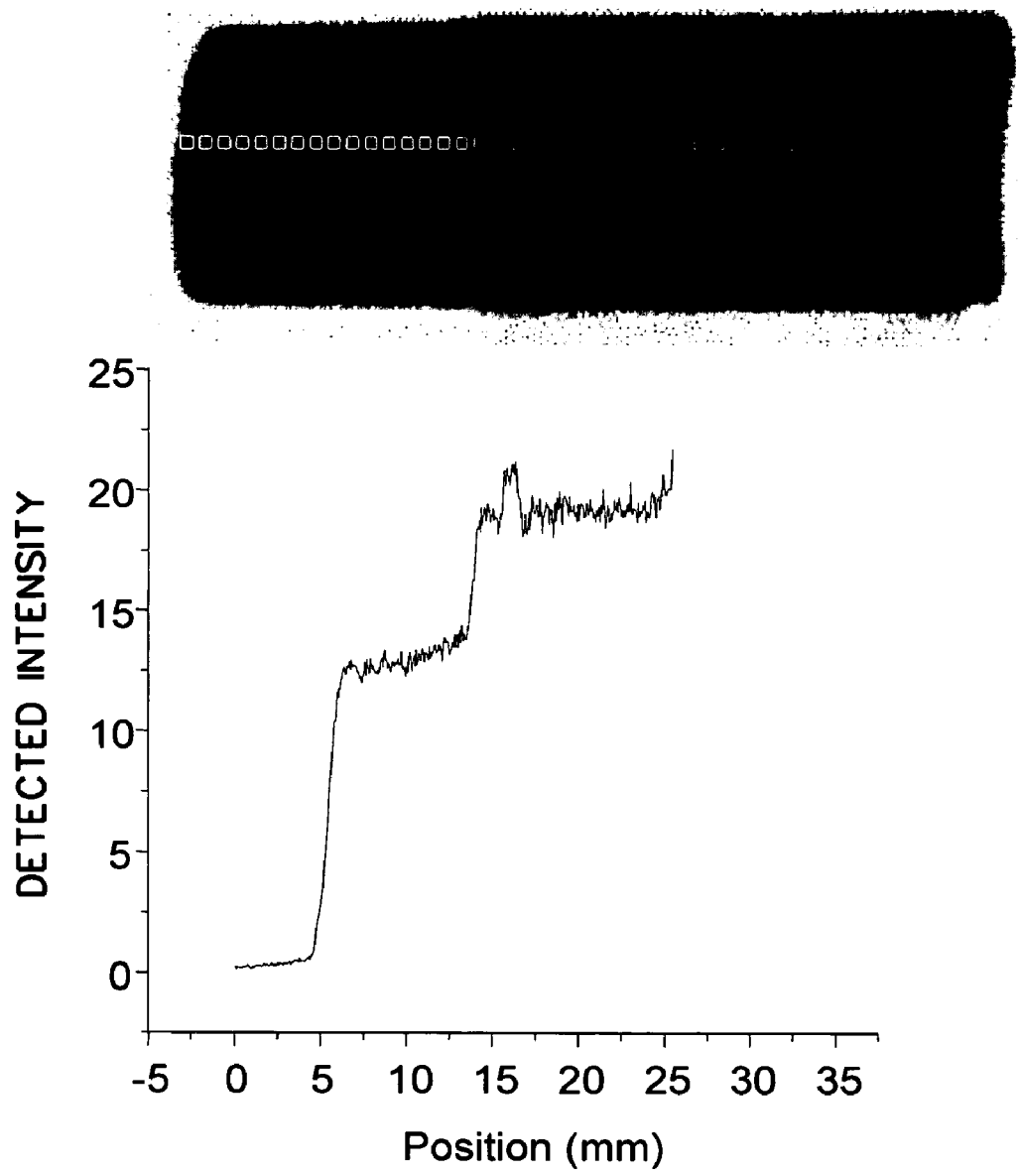
FIG. 10 is a graph of detected intensity versus position for the phantom of FIG. 9, imaged using an x-ray imaging system such as depicted in FIG. 7, in accordance with an aspect of the present invention.

Monochromatic contrast measurements were also performed on the polypropylene phantom with 5 mm step height (see FIG. 9), then on a 12 mm thick polystyrene phantom (not shown) with two holes of 6 mm and 7 mm depths. For the polypropylene step phantom, the image with a monochromatic beam and its intensity profile are shown in FIG. 10. The measured and calculated contrasts are listed in Table 2. The measurements are in good agreement with the calculations. As listed in Table 2, a contrast ratio of 2.5 is obtained compared to the contrast measured with the full spectrum radiation before the optics.

TABLE 2

| Step height | Contrast Mono beam | | Contrast ratio |
|---|---|---|---|
| (mm) | Data | Calc. | Data |
| 5 | 0.45 ± 0.05 | 0.38 | 2.5 |

Figure 11:
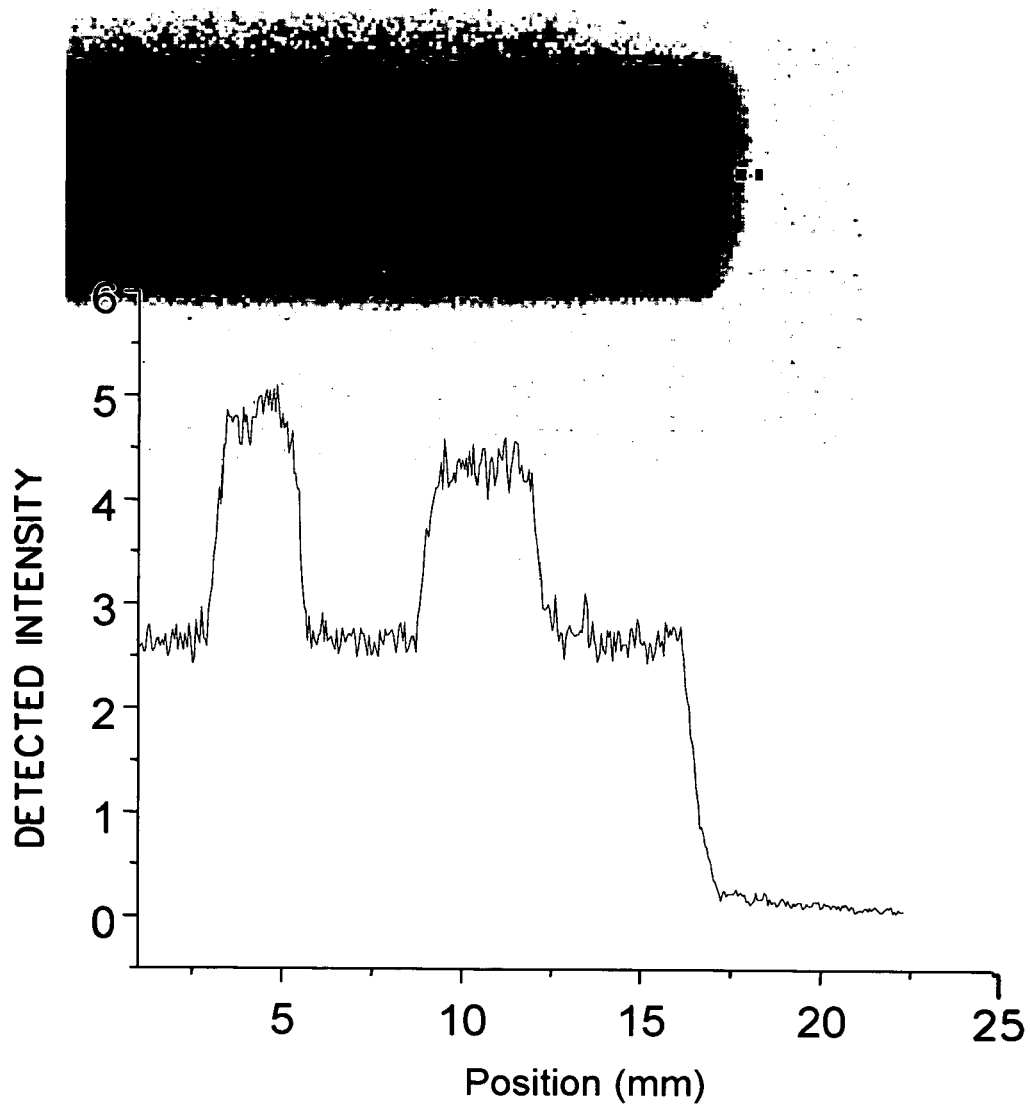
FIG. 11 is an image of two phantom holes of different depths of 6 mm and 7 mm, and their intensity profile through the dashed line, imaged using an x-ray imaging system such as depicted in FIG. 7, in accordance with an aspect of the present invention.
Figure 12:
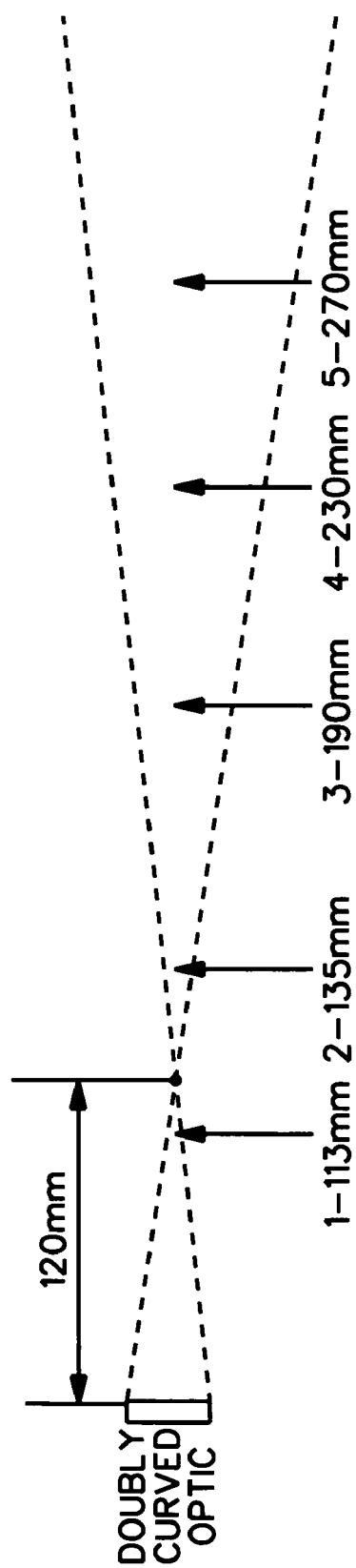
FIG. 12 is a depiction of a focused monochromatic x-ray beam directed from a point-focusing, curved monochromating optic, and marking various positions for knife-edge resolution measurements in testing of an x-ray imaging system, such as depicted in FIG. 7, in accordance with an aspect of the present invention.

The image of the polystrene phantom and its intensity profile are shown in FIG. 11. The figure shows two holes of different depths of 6 mm and 7 mm, with the intensity profile being taken through the dashed line. The source voltage was 35 kV at 10 W power. The phantom was translated at 0.1 mm/s with an exposure time of three minutes. The measured and calculated contrasts are shown in Table 3.

TABLE 3

| Hole Depth | Contrast | |
|---|---|---|
| (mm) | Data | Calc. |
| 6 | 0.46 ± 0.07 | 0.40 |
| 7 | 0.59 ± 0.10 | 0.49 |

For any imaging system, image resolution is an important parameter. For thick objects or large object-to-detector distances, spatial resolution is approximately proportional to the angular divergence, also called angular resolution. Angular resolution measurements were performed with an Oxford Instrument Microfocus 5011 molybdenum source. This source has a larger focal spot size, approximately 60 μm, somewhat closer to that of a clinical source than the 15 μm spot size of the Oxford Microfocus source.

Angular resolution was measured by recording a knife edge shadow with a Fuji restimuble phosphor computed radiography image plate with 50 μm pixels. The knife-edge was placed after the crystal to block half of the output beam. The intensity profile recorded by the detector was differentiated and a Gaussian fit used to obtain the full width at half maximum. The detector angular resolution, $\sigma_D$, is 50 μm divided by the knife to detector distance. The results listed in Tables 4 and 5 have the detector resolution subtracted in quadrature; the measured angular resolution is assumed to be $\sqrt{\sigma^2+\sigma_D^2}$ where σ is the actual angular resolution of the x-ray beam. First, the resolutions were measured with the knife-edge 70 mm beyond the output focal point, which is 190 mm from the optics so that the beam is diverging rather than converging. The image plate was placed at 50, 200, 300, 450 mm distances to the knife-edge. The resolutions are different in the horizontal and vertical directions because the convergence angles are different. For this detector, which had 50 micron pixels, increasing the plate distance beyond 300 mm did not greatly improve the resolution, so the remaining measurements were made with a plate distance of 300 mm. Then measurements were performed for the different knife-edge positions shown in FIG. 12. The measured results are shown in Table 5. The angular resolution changes with distance from the optic as different fractions of the total convergence are sampled. As expected, the resolution is improved as the distance of the phantom from the output focal point is increased. However, the uniformity, which is quite good at 70 mm from the focal spot, as shown in FIGS. 10 & 11, is somewhat poorer at longer focal spot to phantom distances. The resolution might be further improved without a decrease in uniformity by increasing the output focal length in an asymmetric optic design. If the beam is to be scanned, uniformity in the direction along the scan is not critical.

TABLE 4

| knife distance to optic (mm) | plate distance to knife (mm) | Horizontal angular width (mrad) | Vertical angular width (mrad) |
|---|---|---|---|
| 190 | 50 | 4.83 ± 0.24 | 6.05 ± 0.12 |
| 190 | 200 | 1.68 ± 0.15 | 2.97 ± 0.26 |
| 190 | 300 | 1.07 ± 0.15 | 2.78 ± 0.42 |
| 190 | 450 | 1.06 ± 0.27 | 2.73 ± 0.26 |

As shown in FIG. 8, the flux diffracted by the DCC optic was measured with a Ge detector. The diffraction efficiency η of the DCC optic, which is the ratio of the number of photons diffracting from the optic to incident photons on the surface of the optic, obtained with an aperture measurement, was calculated by:

$$\eta_{DCC} = \frac{C_D}{C_W} \frac{A_{aper}}{A_{optic}} \left(\frac{d_{optic}}{d_{aper}}\right)^2$$

where $C_D$ is the diffracted counts, $C_W$ is the counts without the optic, $A_{aper}$ is the area of the aperture, $A_{optic}$ is the effective area of the optic surface, $d_{optic}$ is the optic distance to the source, $d_{aper}$ is the aperture distance to the source. Considering only those input photons within a 1 keV window from 17 to 18 keV, the diffraction efficiency η is 1.8%.

Estimating the efficiency η as the ratio of the crystal bandwidth $\sigma_c$ to the sum in quadrature of the of the source divergence $\sigma_s$ and the energy angular bandwidth, $\sigma_E$ gives:

$$\eta = \frac{\sigma_c}{\sqrt{\sigma_S^2 + \sigma_E^2}} = 1.9\%$$

where $\sigma_s$ is the ratio of the source size to the source distance, about 0.5 mrad, and $\sigma_E$~0.2 mrad is the angular width, computed from Bragg's law, due to the energy width of the characteristic line. The calculated η is in good agreement with the measurement.

TABLE 5

| | knife dist. to optic (mm) | Dist. from focal point (mm) | Horizontal angular width (mrad) | Vertical angular width (mrad) |
|---|---|---|---|---|
| 1 | 113 | −7 | 1.32 + 0.35 | 13.7 + 1.6 |
| 2 | 135 | 15 | 1.89 + 0.41 | 12.1 + 2.1 |
| 3 | 190 | 70 | 1.09 + 0.15 | 2.8 + 0.42 |
| 4 | 245 | 125 | 0.87 + 0.15 | 2.0 + 0.46 |
| 5 | 300 | 180 | 0.62 + 0.15 | 1.15 + 0.28 |

Measured diffraction fluxes using the DCC optic at different source voltages with a current of 0.1 mA are shown in Table 6.

TABLE 6

| Source voltage (kV) | Measured flux (photons/s/kW) |
|---|---|
| 20 | (1.0 ± 0.01) * $10^7$ |
| 23 | (7.2 ± 0.03) * $10^7$ |
| 25 | (1.4 ± 0.03) * $10^8$ |

TABLE 6-continued

| Source voltage (kV) | Measured flux (photons/s/kW) |
|---|---|
| 28 | (2.6 ± 0.05) * $10^8$ |
| 30 | (3.6 ± 0.06) * $10^8$ |

The intensity at different distances to the optic is shown in Table 7.

TABLE 7

| Detector distance to optic (mm) | Detector distance to focal point (mm) | Measured intensity (photons/s/cm$^2$) |
|---|---|---|
| 230 | 110 | (2.2 ± 0.001) * $10^{10}$ |
| 310 | 190 | (9.0 ± 0.009) * $10^9$ |
| 390 | 270 | (5.1 ± 0.007) * $10^9$ |
| 500 | 380 | (2.9 ± 0.005) * $10^9$ |
| 630 | 510 | (1.8 ± 0.004) * $10^9$ |

Those skilled in the art will note from the above discussion that x-ray imaging systems are presented herein which employ one or more point-focusing, curved monochromating optics for directing out a focused monochromatic x-ray beam for use in imaging an object, such as a patient. Monochromatization of x-rays can be readily achieved using doubly-curved crystal optics or doubly-curved multilayer optical devices. In addition, such optics are relatively easy to make in large sizes so that an x-ray imaging system as proposed herein is simpler and easier to produce then conventional approaches. Beam divergence of the x-ray imaging system can be controlled by increasing the optic-to-object distance, or changing the optic design to increase the output focal length.

The optics discussed above include curved crystal optics (see e.g., X-Ray Optical, Inc.'s, U.S. Pat. Nos. 6,285,506, 6,317,483, and U.S. Provisional Application Ser. No. 60/400, 809, filed Aug. 2, 2002, entitled "An Optical Device for Directing X-Rays Having a Plurality of Crystals", and perfected as PCT Application No. PCT/US2003/023412, filed Jul. 25, 2003, and published under the PCT Articles in English as WO 2004/013867 A2 on Feb. 12, 2004)—each of which are incorporated by reference herein in their entirety); or similarly functioning multi-layer optics. The optics may provide beam gain, as well as general beam control.

Also, as discussed above, monochromating optical elements may be desirable for narrowing the radiation bands depending on system requirements. Many of the optics discussed above, especially curved crystal optics and multi-layer optics, can be employed for this function, as set forth in many of the above-incorporated U.S. patents.

Optic/source combinations are also useable such as those disclosed in X-Ray Optical Systems, Inc.'s U.S. Pat. No. 5,570,408, issued Oct. 29, 1996, as well as in U.S. Provisional Application Ser. Nos.: (1) 60/398,968 (filed Jul. 26, 2002, entitled "Method and Device for Cooling and Electrically-Insulating a High-Voltage, Heat-Generating Component," and perfected as PCT Application PCT/US02/38803); (2) 60/398,965 (filed Jul. 26, 2002, entitled "X-Ray Source Assembly Having Enhanced Output Stability," and perfected as PCT Application PCT/US02/38493); (3) 60/492,353 (filed Aug. 4, 2003, entitled "X-Ray Source Assembly Having Enhanced Output Stability Using Tube Power Adjustments and Remote Calibration"); and (4) 60/336,584 (filed Dec. 4, 2001, and entitled "X-Ray Tube and Method and Apparatus for Analyzing Fluid Streams Using X-Rays," perfected as PCT Application PCT/US02/38792-WO03/048745, entitled "X-Ray Tube and Method and Apparatus for Analyzing Fluid Streams Using X-Rays")—all of which are incorporated by reference herein in their entirety.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An x-ray imaging system comprising:
    an x-ray source;
    an optical device for directing x-rays from the x-ray source, the optical device comprising at least one point-focusing, curved monochromating optic for directing x-rays from the x-ray source towards a focal point in the form of a focused monochromatic x-ray beam;
    a detector aligned with the focused monochromatic x-ray beam directed from of the optical device, the detector being an imaging detector;
    wherein the optical device facilitates radiographic imaging of an object using the detector when the object is located between the optical device and the detector, within the focused monochromatic x-ray beam provided by the optical device; and
    wherein the optical device facilitates image demagnification of the object with the object placed within the focused monochromatic x-ray beam before the focal point, and the detector located closer to the focal point than the object is to the focal point.

2. The x-ray imaging system of claim 1, wherein each at least one point-focusing, curved monochromating optic of the optical device comprises an optical surface, the optical surface being doubly-curved.

3. The x-ray imaging system of claim 1, wherein the at least one point-focusing, curved monochromating optic of the optical device comprises a plurality of doubly-curved optical crystals or a plurality of doubly-curved multilayer optics.

4. The x-ray imaging system of claim 1, wherein the at least one point-focusing, curved monochromating optic comprises at least one symmetrical optic having equal input and output focal lengths or at least one asymmetrical optic having different input and output focal lengths.

5. The x-ray imaging system of claim 1, wherein the at least one point-focusing, curved monochromating optic comprises a plurality of doubly-curved optics positioned with the x-ray source and the focal point to define at least one Rowland circle of radius R, and wherein the plurality of doubly-curved optics provides focusing of x-rays from the source to the focal point, and the plurality of doubly-curved optics have a surface profile radius in the plane of the Rowland circle different from the radius R.

6. The x-ray imaging system of claim 1, wherein the x-ray source is a low power x-ray source of less than 1,000 watts.

7. The x-ray imaging system of claim 1, wherein the object is a biological object.

8. An x-ray imaging system comprising:
    an x-ray source;
    an optical device for directing x-rays from the x-ray source, the optical device comprising at least one point-focusing, curved monochromating optic for directing x-rays from the x-ray source towards a focal point in the form of a focused monochromatic x-ray beam;
    a detector aligned with the focused monochromatic x-ray beam directed from of the optical device, the detector being an imaging detector;
    wherein the optical device facilitates radiographic imaging of an object using the detector when the object is located between the optical device and the detector, within the focused monochromatic x-ray beam provided by the optical device; and
    wherein the optical device facilitates radiographic imaging of the object with the object located within the focused monochromatic x-ray beam before the focal point and the detector located between the object and the focal point.

9. The x-ray imaging system of claim 8, wherein each at least one point-focusing, curved monochromating optic of the optical device comprises an optical surface, the optical surface being doubly-curved.

10. The x-ray imaging system of claim 8, wherein the at least one point-focusing, curved monochromating optic of the optical device comprises a plurality of doubly-curved optical crystals or a plurality of doubly-curved multilayer optics.

11. The x-ray imaging system of claim 8, wherein the at least one point-focusing, curved monochromating optic comprises at least one symmetrical optic having equal input and output focal lengths or at least one asymmetrical optic having different input and output focal lengths.

12. The x-ray imaging system of claim 8, wherein the at least one point-focusing, curved monochromating optic comprises a plurality of doubly-curved optics positioned with the x-ray source and the focal point to define at least one Rowland circle of radius R, and wherein the plurality of doubly-curved, optics provides focusing of x-rays from the source to the focal point, and the plurality of doubly-curved optics have a surface profile radius in the plane of the Rowland circle different from the radius R.

13. The x-ray imaging system of claim 8, wherein the x-ray source is a low power x-ray source of less than 1,000 watts.

14. The x-ray imaging system of claim 8, wherein the object is a biological object.

15. An x-ray imaging system comprising:
    an x-ray source;
    an optical device for directing x-rays from the x-ray source, the optical device comprising at least one point-focusing, curved monochromating optic for directing x-rays from the x-ray source towards a focal point in the form of a focused monochromatic x-ray beam;
    a detector aligned with the focused monochromatic x-ray beam directed from of the optical device, the detector being an imaging detector;
    wherein the optical device facilitates radiographic imaging of an object using the detector when the object is located between the optical device and the detector, within the focused monochromatic x-ray beam provided by the optical device; and
    wherein the optical device facilitates radiographic imaging of the object with the object located within the focused monochromatic x-ray beam before the focal point and the detector located after the focal point.

16. The x-ray imaging system of claim 15, wherein the optical device facilitates radiographic imaging of the object with the detector located closer to the focal point than the object is to the focal point.

17. The x-ray imaging system of claim 15, wherein the optical device facilitates radiographic imaging of the object with the object located closer to the focal point than the detector.

18. The x-ray imaging system of claim 15, wherein each at least one point-focusing, curved monochromating optic of the optical device comprises an optical surface, the optical surface being doubly-curved.

19. The x-ray imaging system of claim 15, wherein the at least one point-focusing, curved monochromating optic of the optical device comprises a plurality of doubly-curved optical crystals or a plurality of doubly-curved multilayer optics.

20. The x-ray imaging system of claim 15, wherein the at least one point-focusing, curved monochromating optic comprises at least one symmetrical optic having equal input and output focal lengths or at least one asymmetrical optic having different input and output focal lengths.

21. The x-ray imaging system of claim 15, wherein the at least one point-focusing, curved monochromating optic comprises a plurality of doubly-curved optics positioned with the x-ray source and the focal point to define at least one Rowland circle of radius R, and wherein the plurality of doubly-curved optics provides focusing of x-rays from the source to the focal point, and the plurality of doubly-curved optics have a surface profile radius in the plane of the Rowland circle different from the radius R.

22. The x-ray imaging system of claim 15, wherein the x-ray source is a low power x-ray source of less than 1,000 watts.

23. The x-ray imaging system of claim 15, wherein the object is a biological object.

24. An x-ray imaging system comprising:
an x-ray source;
an optical device for directing x-rays from the x-ray source, the optical device comprising at least one point-focusing, curved monochromating optic for directing x-rays from the x-ray source towards a focal point in the form of a focused monochromatic x-ray beam;
a detector aligned with the focused monochromatic x-ray beam directed from of the optical device, the detector being an imaging detector;
wherein the optical device facilitates radiographic imaging of an object using the detector when the object is located between the optical device and the detector, within the focused monochromatic x-ray beam provided by the optical device; and
wherein the optical device facilitates radiographic imaging of the object with the object and the detector located after the focal point.

25. The x-ray imaging system of claim 24, wherein each at least one point-focusing, curved monochromating optic of the optical device comprises an optical surface, the optical surface being doubly-curved.

26. The x-ray imaging system of claim 24, wherein the at least one point-focusing, curved monochromating optic of the optical device comprises a plurality of doubly-curved optical crystals or a plurality of doubly-curved multilayer optics.

27. The x-ray imaging system of claim 24, wherein the at least one point-focusing, curved monochromating optic comprises at least one symmetrical optic having equal input and output focal lengths or at least one asymmetrical optic having different input and output focal lengths.

28. The x-ray imaging system of claim 24, wherein the at least one point-focusing, curved monochromating optic comprises a plurality of doubly-curved optics positioned with the x-ray source and the focal point to define at least one Rowland circle of radius R, and wherein the plurality of doubly-curved optics provides, focusing of x-rays from the source to the focal point, and the plurality of doubly-curved optics have a surface profile radius in the plane of the Rowland circle different from the radius R.

29. The x-ray imaging system of claim 24, wherein the x-ray source is a low power x-ray source of less than 1,000 watts.

30. The x-ray imaging system of claim 24, wherein the object is a biological object.

31. An x-ray imaging system comprising:
an x-ray source;
a first optical device comprising at least one first point-focusing, curved monochromating optic for directing x-rays from the x-ray source towards a first focal point in the form of a first focused monochromatic x-ray beam;
a second optical device aligned with the first focused monochromatic x-ray beam directed from the first optical device, the second optical device comprising at least one second point-focusing, curved monochromating optic for directing x-rays of the first focused monochromatic x-ray beam towards a second focal point in the form of a second focused monochromatic x-ray beam;
a detector aligned with the second focused monochromatic x-ray beam directed from the second optical device, the detector being an imaging detector; and
wherein the first and second optical devices facilitate x-ray imaging of an object using the detector when the object is located between the first optical device and the second optical device within the first focused monochromatic x-ray beam.

32. The x-ray imaging device of claim 31, wherein the at least one first point-focusing, curved monochromating optic and the at least one second point-focusing, curved monochromating optic each comprises an optical surface, the optical surface being doubly-curved.

33. The x-ray imaging system of claim 31, wherein the at least one first point-focusing, curved monochromating optic and the at least one second point-focusing, curved monochromating optic comprise at least one of a plurality of doubly-curved optical crystals and a plurality of doubly-curved multilayer optics.

34. The x-ray imaging system of claim 31, wherein the at least one first point-focusing, curved monochromating optic comprises a first plurality of doubly-curved optics positioned with the x-ray source and the first focal point to define at least one Rowland circle of radius R, and wherein the first plurality of doubly-curved optics provides focusing of x-rays from the source to the first focal point, and wherein the first plurality of doubly-curved optics have a surface profile radius in the plane of the Rowland circle different from the radius R, and wherein the at least one second point-focusing, curved monochromating optic comprises a second plurality of doubly-curved optics positioned with the first focal point and the second focal point to define at least one Rowland circle of radius R', and wherein the second plurality of doubly-curved optics provides focusing of x-rays from the first focal point, and wherein the second plurality of doubly-curved optics have a surface profile radius in the plane of the Rowland circle different from the radius R'.

35. The x-ray imaging system of claim 31, wherein the first and second optical devices facilitate imaging of the object using the detector when the object is located between the first focal point and the second optical device within the first focused monochromatic x-ray beam.

36. The x-ray imaging system of claim 31, wherein the first and second optical devices facilitate imaging of the object using the detector when the object is located between the first optical device and the first focal point within the first focused monochromatic x-ray beam.

37. The x-ray imaging system of claim 31, wherein at least one of the first and second optical devices facilitates refractive index imaging of the object.

38. The x-ray imaging system of claim 31, wherein at least one of the first and second optical devices facilitates polarized beam imaging of the object.

* * * * *